United States Patent
Keenan

(10) Patent No.: US 7,216,572 B2
(45) Date of Patent: May 15, 2007

(54) SAWDUST COLLECTOR FOR TABLE SAWS

(76) Inventor: Richard Francis Keenan, 1579 B Mooresfield Rd., Wakefield, RI (US) 02879

(*) Notice: Subject to any disclaimer, the term of this patent is extended or adjusted under 35 U.S.C. 154(b) by 206 days.

(21) Appl. No.: 10/811,024

(22) Filed: Mar. 26, 2004

(65) Prior Publication Data

US 2004/0206220 A1 Oct. 21, 2004

Related U.S. Application Data

(60) Provisional application No. 60/459,039, filed on Mar. 31, 2003.

(51) Int. Cl.
*B27B 5/29* (2006.01)
*B65D 33/14* (2006.01)
*B27B 5/16* (2006.01)

(52) U.S. Cl. .................. 83/100; 83/167; 144/252.1; 144/286.1; 451/456

(58) Field of Classification Search ............. 83/100, 83/162, 165, 167; 15/257.1, 257.3, 257.9; 55/367, 378; 144/252.1, 252.2, 286.1; 451/456
See application file for complete search history.

(56) References Cited

U.S. PATENT DOCUMENTS

| | | | | |
|---|---|---|---|---|
| 2,621,497 A | * | 12/1952 | Davie | 15/257.9 |
| 3,755,993 A | * | 9/1973 | Cote | 55/370 |
| 4,139,037 A | * | 2/1979 | McGuigan | 383/9 |
| 4,144,781 A | | 3/1979 | Kreitz | |
| 4,201,256 A | * | 5/1980 | Truhan | 144/252.2 |
| 4,299,605 A | * | 11/1981 | Aiyama et al. | 55/370 |
| 4,326,864 A | * | 4/1982 | Sittler | 55/364 |
| 4,367,665 A | | 1/1983 | Terpstra et al. | |
| 4,489,909 A | | 12/1984 | Terpstra et al. | |
| 4,576,072 A | | 3/1986 | Terpstra et al. | |
| 5,340,218 A | * | 8/1994 | Cuthbertson | 383/67 |
| 5,582,225 A | | 12/1996 | Schank | |
| 5,873,498 A | * | 2/1999 | Moore et al. | 222/181.2 |
| 6,071,322 A | * | 6/2000 | Hulthen | 55/367 |

OTHER PUBLICATIONS

"Dust-Proof Your Contractor's Saw," Fine Woodworking Magazine, Dec. 2000 (submitted by applicant).*

* cited by examiner

Primary Examiner—Clark F. Dexter

(57) ABSTRACT

A table saw having a horizontal worktable, an open bottom base below the worktable enclosing a rotating blade that cuts wood objects on the worktable surface, and a stand for supporting the base from the floor. The table saw further including a sawdust collector for removable attachment to the base. The sawdust collector including a flexible catch bag with an opening at its top to receive the sawdust, a connection at the bottom for attachment to a vacuum device, and a zipper at the bottom for batch-wise collection and continuous discharge of sawdust. The outer peripheral edge of the top opening has a fastening structure, such as VELCRO, that permits the sawdust collector to be removably attached to a corresponding fastening structure of the table saw.

16 Claims, 3 Drawing Sheets

SAWDUST COLLECTOR FOR TABLE SAWS

CROSS-REFERENCE TO RELATED APPLICATIONS

This application claims priority to U.S. Provisional Patent Application No. 60/459,039 filed Mar. 31, 2003.

FIELD OF THE INVENTION

The present invention relates to sawdust collectors and, more particularly, to collectors which can be removably attached to table saws and allow for the systematic removal of sawdust. The invention also relates to a kit for installing a sawdust collector.

BACKGROUND OF THE INVENTION

Users of table saws have long coped with flying sawdust particles by cutting wood outdoors, wearing masks, building makeshift bins, building plastic enclosures around their work area or using canvas bags attached to the underside of the table saw. Cutting wood outdoors is limited by weather conditions which can disrupt work schedules when indoor cutting is not permissible. Moreover, sawdust particles dropping to the ground are easily tracked into living areas of the home and become lodged in carpets and in furnishings where they can create an unhealthy environment. According to the National Institute for Occupational Safety and Health (NIOSH), table saws create a significant amount of wood dust which is known to cause health problems including eye and skin irritation, allergy, reduced lung function, asthma, and nasal cancer. Wood dust is known to be a human carcinogen.

Therefore, a need exists for a sawdust collector that is easily attached and removed from a table saw and permits the user to work indoors without producing significant amounts of sawdust.

A number of products have been designed to collect sawdust generated by table saws. For example, U.S. Pat. No. 4,367,665 issued to Terpstra, et al. on Jan. 11, 1983 discloses a sawdust collector bag detachably connected to and closing the bottom of the base for collecting downwardly directed sawdust, and an elaborate blower and conduit structure for withdrawing fine sawdust through the top of the saw blade guard and from the back side of the table saw. The blower and conduit configuration renders table saws to be difficult to move and essentially non-portable. In typical saw operations, most of the sawdust not dropping straight down, flies straight out across the table in a direct path from the downward circulating saw blade and under the guard at a very rapid rate of speed. Little sawdust flies up into the saw guard because of the direction of the blade's rotation and the location of the wood being cut. If the blade direction was to be reversed, this apparatus may work well but may also render the table saw inoperable. Further, since over 85% of sawdust is directed downward, and most of the remaining 15% leaks through the vents in the base, it is not likely that the blower and conduit mechanism are of any real value. The detachable bag has to be removed to empty the sawdust from it as it is not connected to the motorized dust collector. This unit is very expensive to manufacture.

U.S. Pat. No. 4,489,909 issued to Terpstra, et al. on Dec. 25, 1984 discloses a sawdust collector bag arranged for convenient detachable connection to walls of an open stand using retaining clips. This is essentially the same bag as discussed above for the '665 patent, but with a new means of connecting and detaching the bag from the table saw unit. This bag is floor length and must be removed from the stand and manually emptied.

U.S. Pat. No. 4,576,072 issued to Terpstra, et al. on Mar. 18, 1986 discloses a sawdust collection apparatus which includes a specially formed and hinged, table top saw guard and sawdust collector to which a vacuum hose is connected in a manner to admit air bleeding such that air particles are drawn into the collector while excluding small pieces of wood. The design also includes a deflector mounted on the swinging saw cradle below the table in the saw base for directing sawdust downwardly to a collector bag, foamed synthetic material for sealing various openings in the saw base and a removable bracket for supporting the vacuum hose above the saw table. This apparatus has many parts when in combination collect very little sawdust as noted above with reference to the '665 patent.

U.S. Pat. No. 4,144,781 issued to Kreitz on Mar. 20, 1979 discloses a funnel-shaped flat-bottomed shroud positioned at the rear of the worktable and connects to a vacuum. The collector adjusts along the table base such that it aligns with the saw blade even when doing bevel cuts. This invention is specifically designed for radial arm saws and is not adaptable to table saws.

U.S. Pat. No. 5,582,225 issued to Schank on Dec. 10, 1996, discloses a workbench consisting of a top working surface containing holes that allow sawdust and chips to land in a plenum which slopes to a vacuum connection. The vacuum connection is a bifurcated input manifold allowing the operator to select between applying the vacuum to the plenum or applying the vacuum to a hose containing a vacuum cleaning tool for cleaning the surface of the work bench. A table saw with the stand removed, could be placed on the work bench but the work bench would require a re-design so that the operator could reasonably be able to work close enough to the work surface to make accurate cuts. If a redesign were practical, sawdust particles from the saw would deflect upward off the work bench surface between and around the holes of the plenum.

A product currently sold to the public is the Craftsman Table Saw Sawdust Collection Kit Model 9-29962, is a plastic box type unit, V shaped on two opposing sides designed as a conduit to vacuum hoses. This unit is specifically designed for Craftsman table saws and must be used with a vacuum. It does not have a sawdust drop option and can only be installed and removed by separating the table saw from the stand. It can not be installed into the base of the table saw and must be installed in units having a stand.

A second product on the market is Craftsman item 00922100000 which is a collection bag designed for Craftsman table saws. It attaches to a bracket installed between the table saw and the table saw stand. The dust collection bag must be removed for emptying and does not have a vacuum connection.

A third product on the market is named Less-Mess which is a floor length snap on sawdust collection bag designed for table saws with stands. The sawdust collection bag must be removed for emptying, does not have a vacuum connection and does not have any other means for continuous evacuation of sawdust.

Fine Woodworking Magazine profiled a build-it-yourself sawdust collection system for table saws in its December 2000 issue in an article entitled Dust-Proof Your Contractor's Saw. This device is a plywood box mounted to the underside of a table saw stand, one side of which has a dust port which must be connected to a motorized sawdust collector. The design is very similar to the aforementioned Craftsman Table Saw Sawdust Collection Kit Model 9-29962 but has a back plate for table saws having external motors. While this design requires attaching a motorized sawdust collector to it, it would be possible to use a vacuum adapter to enable the attachment of workshop vacuums. It does not have a sawdust drop option, must be attached to a table saw stand and is not easily removed.

SUMMARY OF THE INVENTION

The dust collector for a table saw herein disclosed includes an attachable flexible catch basin (i.e., container) having a connection for workshop vacuums and a zippered bottom which provide for different and convenient modes of operation for capturing and disposing of virtually all sawdust.

Therefore, an object of the invention is a sawdust collector for use with table saws that is lightweight, flexible and portable and can easily be attached and removed.

A further object is a sawdust collector as above that is provided with a closure, such as a zipper near the bottom of the collector to permit the batch-wise removal of the collected sawdust by opening the closure, or to permit the continuous removal of the collected sawdust by allowing the sawdust to pass through the opened closure into a separate receptacle.

Yet a further object is a sawdust collector as above that is provided with a vacuum connector near the bottom of the collector for continuous withdrawal of collected sawdust by connection to a vacuum source, such as a workshop vacuum.

Yet a further object is a sawdust collector as above which can be alternatively used to remove the collected sawdust in various operating modes, i.e., in either a batch-wise mode through a closure, a continuous mode through the closure into a separate receptacle, or a continuous mode through a vacuum connection.

Yet a further object is a kit containing the sawdust collector as above including a separate corresponding fastener, e.g., hook-and-loop fastener strip with adhesive backing, which can be permanently applied to a table saw stand or to a table saw base.

Yet a further object is to provide a sawdust collector that will fit different sizes and makes of table saw stands and different sizes and makes of table saw bases.

Yet a further object is to provide a sawdust collector that will attach to a variety of vacuum sources.

Further objects and advantages are to provide a sawdust collector as above that is easy to install, and easy to change from one operating mode to another, can remain fixed indefinitely or easily removed and can be easily manufactured at minimum cost.

DETAILED DESCRIPTION OF THE PREFERRED EMBODIMENTS

Figure 1:
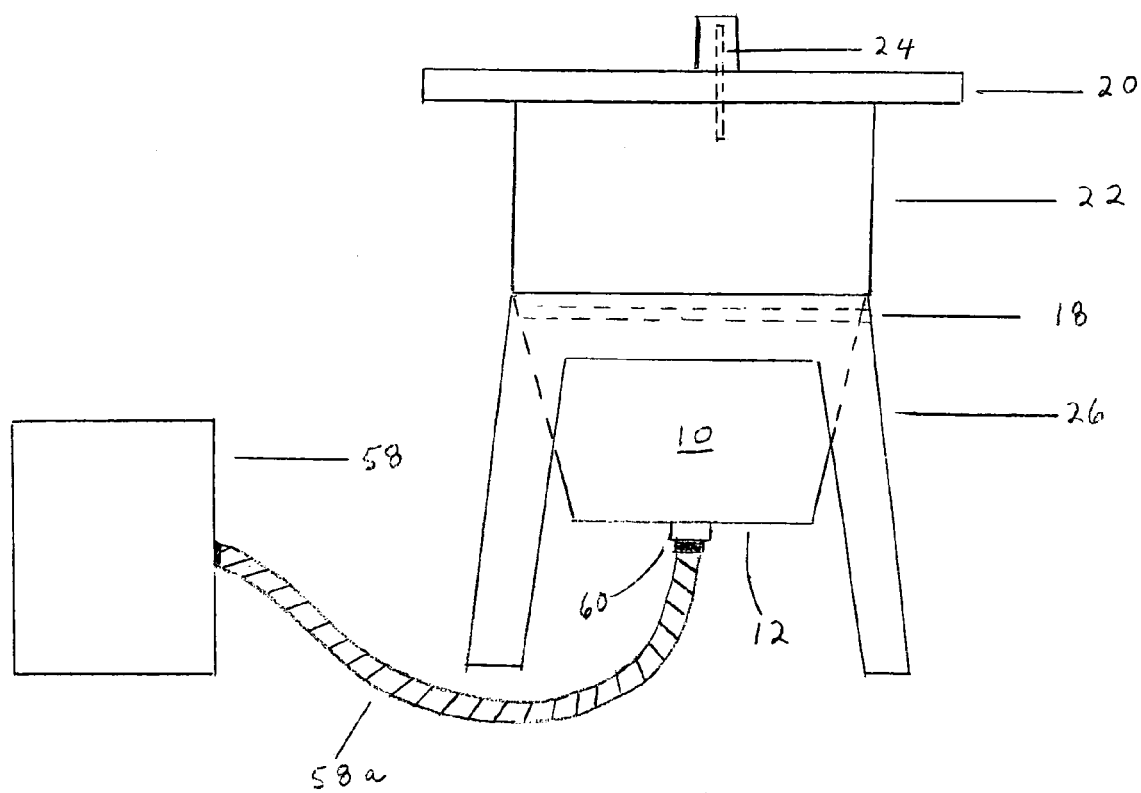
FIG. 1 is a front view of a sawdust collector in accordance with the invention, which is attached to a table saw.
Figure 2:
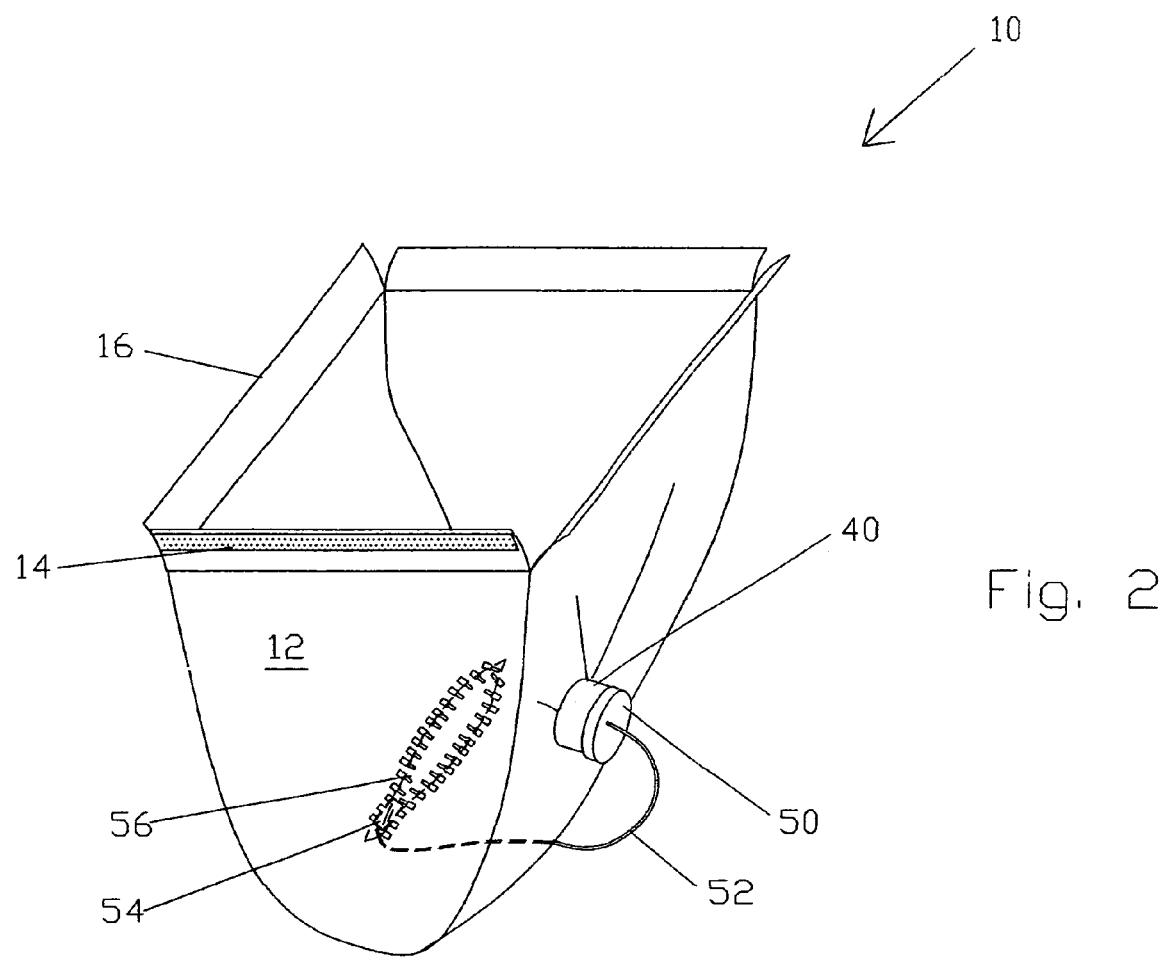
FIG. 2 is a perspective view of the sawdust collector in accordance with the invention.

FIG. 1 shows the sawdust collector 10 in accordance with the invention, attached to a table saw. The table saw includes a horizontal worktable 20, an open bottom base 22 below the worktable enclosing a rotating blade 24, that cuts wood objects on the worktable surface, a motor or mechanism for driving the saw blade (not shown), a saw blade elevating tilting mechanism (not shown), and a table saw stand 26. The blade rotates in a direction that ensures the sawdust will be forced in a downward direction, i.e., into the container portion 12 of the collector, through the upper opening of the container. FIG. 2 shows details of the collector 10 without the table saw. The container is preferably flaccid and flexible, and can be made of any flaccid, flexible material that adequately contains the sawdust and is easily manufactured. Exemplary materials include cloth, such as cotton duck, but can include any other suitable materials such as plastic.

Preferably, the container portion of the collector is made from a single patterned sheet of flaccid, flexible material, that is then formed into a three-dimensional basin-shaped structure by fastening the appropriate edges of the patterned sheets together. This can be done by sewing the edges to form seams or, alternatively, by using adhesives or heat-sealing, or any combination of these.

At the bottom of the collector is a closure, preferably a zipper 56, that permits the user to remove the collected sawdust either in a batch-wise or continuous manner during use.

A vacuum connector (generally indicated as 60 in FIG. 1) is also placed near the bottom of the container to permit continuous removal of the collected sawdust by a vacuum source 58 (in FIG. 1). The external portion of the vacuum connector is shown in FIG. 2, showing the larger diameter portion 40 of the connector.

When the vacuum connector is not being used, e.g., when the mode of operation is by removal of the collected sawdust through the closure 56, a plug 50 can be inserted into the external portion 40 of the vacuum connector. This plug is preferably made of foamed polyethylene and is attached by a cord 52 to the collector, such as to the sliding element 54 of a zipper 56. The zipper can be made of any suitable material such as metal or plastic.

Along the inside periphery of the table saw stand, immediately below the top support surface (in FIG. 1), a fastener 18 is provided to hold the sawdust collector in place. This fastening structure cooperates with the corresponding fastener structure 14 (in FIG. 2) that is formed along the outer periphery of the upper opening of the container. Preferably, the cooperating fasteners 14 and 18 are hook-and-loop fasteners, such as VELCRO. In addition, the edge of the upper opening of the container 12 is made up of a set of 4 separated flaps 16, one flap on each side, that correspond to the shape of the fasteners placed on the upper inner surfaces of the table saw stand. When the collector 10 is installed onto smaller table saw stands, the corners of the flaps, being separated, can overlap thereby ensuring an adequate seal.

Figure 3A:
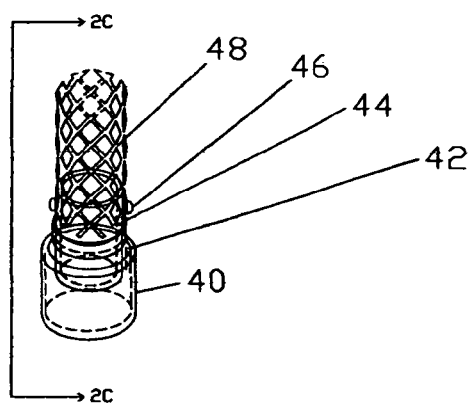
FIGS. 3A, 3B and 3C are a detailed perspective view, a cross-sectional view, and an exploded view of the vacuum connector showing anti-collapse structure.
Figure 3B:
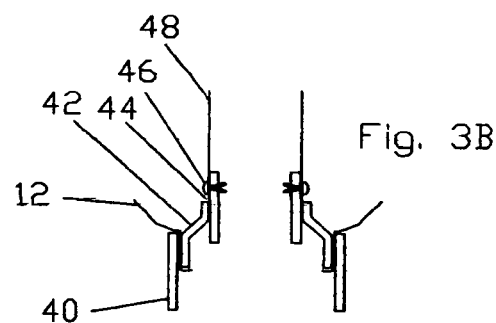
Figure 3C:
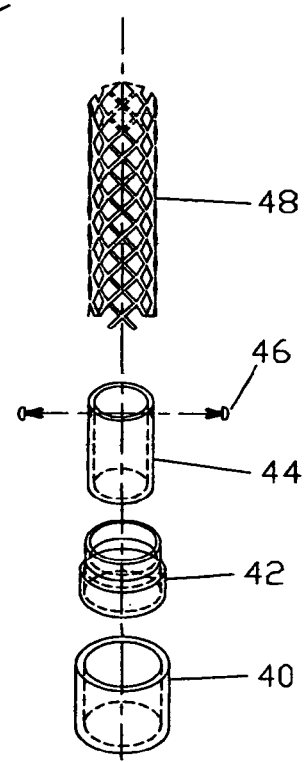

Details of a vacuum connector in accordance with the invention, including the external and internal portions, are shown in FIGS. 3A, 3B and 3C.

External portion 40 of the vacuum connector is attached to internal portion 44 through a reducing coupler 42. These three portions of the vacuum connector can be made of PVC (polyvinylchloride) piping that is often used in plumbing systems. Preferably, the external portion 40 is a 2.25 inch inside diameter PVC pipe connector and internal portion 44 is 1.25 inch inside diameter PVC pipe connector. FIG. 3B shows where the vacuum connector is attached to container 12. The three portions can be fastened by any suitable technique, such as press-fitting, solvent-adhering, adhesively adhering, melt-sealing, etc.

An anti-collapse structure 48 is attached to the outside surface of internal portion 44 of the vacuum connector, in this case using fastening elements 46, such as nylon push fasteners. The anti-collapse structure can be any suitable structure that prevents the container 12 from collapsing into the opening of the internal portion 44, thereby preventing the vacuum opening from being blocked. The structure 48 is preferably a sturdy mesh material having openings that permit sawdust to freely pass through the vacuum connection while preventing collapse of the container. The mesh material can be any plastic such as high density polyethylene or metal having adequate size to permit sawdust to pass through it, and having adequate strength to prevent collapse of the container during an applied vacuum.

The overall dimensions of the sawdust collector are selected to accommodate a range of sizes of table saws and table saw stands. Preferably the vertical depth is 12 inches.

The structure of the sawdust collector permits its use in various operating modes: batch-wise, continuous, and vacuum withdrawal of the collected sawdust.

In a batch-wise operating mode, the closure 56 (in FIG. 2) is closed and the external portion 40 is plugged with plug 50. When materials are being cut, sawdust is directed downward by the rotating blade and by gravity and accumulates in container 12. When the container is filled, the contents can be removed by opening closure 56 to empty the container by gravity into a separate receptacle (not shown), or by attaching a vacuum source 58 (in FIG. 1) to the vacuum connector, turning on the vacuum source and withdrawing the contents of container 12. In the continuous mode, the contents can be continuously removed by gravity through the closure 56 (the closure being open and the vacuum connector plugged). In the vacuum mode, the plug 50 is removed from the vacuum connector 60 (in FIG. 1), a vacuum hose 58*a* is inserted into the connector and closure 56 is closed. The vacuum source 58 is turned on, withdrawing sawdust from the collector as materials are being cut.

The vacuum connector conveniently allows either a 2.25 inch or a 1.25 inch vacuum hose from a vacuum source to be easily attached.

The sawdust collector can be installed on a wide variety of table saw stands and table saw bases.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A woodworking apparatus including a sawdust collector, the woodworking apparatus having a horizontal worktable, a base below the worktable, and a tool extending above the worktable surface for cutting wood objects on the worktable surface, the base allowing sawdust generated by the tool to fall into a space below the worktable, and a first fastener structure provided on the base, the sawdust collector removably attached to the base for collecting sawdust during use of the table saw, the sawdust collector comprising:

a container having an upper opening, inwardly sloping sides and a bottom portion, the bottom portion including a closure and a vacuum connector device, the closure being manipulable into an open position for permitting the removal of dust collected in the container, or into a closed position, and the vacuum connector being connectable to a vacuum source;

wherein the container includes a second fastener structure along the upper opening, and wherein the second fastener structure is removably attached to the first fastener structure on the base.

2. The woodworking apparatus of claim 1 wherein the container is a bag.

3. The woodworking apparatus of claim 2 wherein the bag is made of cloth.

4. The woodworking apparatus of claim 2 wherein the bag is made from a one-piece fabric.

5. The woodworking apparatus of claim 1 wherein the closure is a zipper.

6. The woodworking apparatus of claim 1 wherein the vacuum connector is adapted to connect to a vacuum hose.

7. The woodworking apparatus of claim 1 further including a collapse prevention structure attached to the vacuum connector inside the container to prevent the collapse of the container into the vacuum connector when the vacuum is applied during use.

8. The woodworking apparatus of claim 7 wherein the collapse prevention structure is a mesh screen.

9. The woodworking apparatus of claim 8 wherein the mesh screen is made of plastic.

10. The woodworking apparatus of claim 9 wherein the plastic is high density polyethylene.

11. The woodworking apparatus of claim 8 wherein the mesh screen is attached to the vacuum connector with at least one fastener.

12. The woodworking apparatus of claim 11 wherein the at least one mesh screen fastener is made of plastic.

13. The woodworking apparatus of claim 1 wherein the first and second fastener structures are hook-and-loop fasteners.

14. The woodworking apparatus of claim 13 wherein the hook-and-loop fasteners are elongated strips.

15. The woodworking apparatus of claim 14 wherein the elongated strips are adhesively backed for permanent mounting on the table saw.

16. The woodworking apparatus of claim 1 wherein the tool is a rotating blade.

* * * * *